United States Patent [19]

Miyakawa et al.

[11] Patent Number: 5,424,019
[45] Date of Patent: Jun. 13, 1995

[54] METHOD FOR MANUFACTURING WEATHER STRIPS FOR MOTOR VEHICLES

[75] Inventors: Naohisa Miyakawa, Inba; Katsuhisa Kato, Kitasouma, both of Japan

[73] Assignees: Tokiwa Chemical Industries Co., Ltd., Chiba; System Technical Co., Ltd., Ibaragi, both of Japan

[21] Appl. No.: 165,990

[22] Filed: Dec. 14, 1993

[30] Foreign Application Priority Data

Jun. 7, 1993 [JP] Japan .................. 5-173551

[51] Int. Cl.⁶ .................. B29C 47/06; B29B 11/16
[52] U.S. Cl. .................. 264/177.17; 264/171; 264/177.2; 264/250; 156/244.11; 156/244.23; 156/244.24; 425/131.1; 296/93
[58] Field of Search ........... 264/260, 171, 250, 177.2, 264/177.1, 177.17; 156/244.11, 99, 108, 242, 244.23, 244.24; 52/208; 425/131.1; 296/93

[56] References Cited

U.S. PATENT DOCUMENTS

| | | | |
|---|---|---|---|
| 3,897,967 | 8/1975 | Barenyi | 293/1 |
| 3,918,206 | 11/1975 | Dochnahl | 49/441 |
| 3,927,493 | 12/1975 | Tsuneishi et al. | 49/476 |
| 4,275,099 | 6/1981 | Dani | 428/31 |
| 4,351,868 | 9/1982 | Otani | 428/120 |
| 4,360,549 | 11/1982 | Ozawa et al. | 428/31 |
| 4,442,156 | 4/1984 | Yamaguchi | 428/142 |
| 4,643,923 | 2/1987 | Bernitz et al. | 428/31 |
| 4,668,543 | 5/1987 | Schlenz | 428/31 |
| 4,897,298 | 1/1990 | Otawa et al. | 428/122 |
| 4,929,490 | 5/1990 | Iwasa | 428/195 |
| 5,013,379 | 5/1991 | Brooks et al. | 156/244.11 |
| 5,014,464 | 5/1991 | Dupuy et al. | 49/440 |
| 5,044,684 | 9/1991 | Yada | 296/93 |
| 5,136,773 | 8/1992 | Mesnel et al. | 29/527.4 |
| 5,183,613 | 2/1993 | Edwards | 264/171 |

FOREIGN PATENT DOCUMENTS

| | | | |
|---|---|---|---|
| 54-107963 | 8/1979 | Japan | B29F 3/00 |
| 62-255217 | 11/1987 | Japan | B60J 1/16 |
| 1-249513 | 10/1989 | Japan | B60J 5/04 |
| 2220969 | 1/1990 | United Kingdom | E06B 7/23 |

*Primary Examiner*—Michael W. Ball
*Assistant Examiner*—Francis J. Lorin
*Attorney, Agent, or Firm*—Wenderoth, Lind, & Ponack

[57] ABSTRACT

A method for manufacturing a weather strip for motor vehicles, wherein the weather strip body is provided with a protective film having a low friction characteristic and an increased tightness on an abutment portion with which the glass pane of the vehicle door is brought into contact. An olefin polymer based resin or a foamed material thereof, is extruded from one extrusion molding machine into a mold, is so to form the weather strip body, while a mixture consisting of a base material of an olefin polymer based resin having low viscosity and high fluidity and grains of particles of an additive material of an olefin polymer based resin having a high viscosity and low fluidity is extruded from another molding machine into the mold, so as to form the protective film. The weather strip body and the protective film are co-extruded and polymerized in the mold, and a rough surface having a plurality of protrusions is formed by the grains or particles of the additive material on the surface of the protective film.

9 Claims, 4 Drawing Sheets

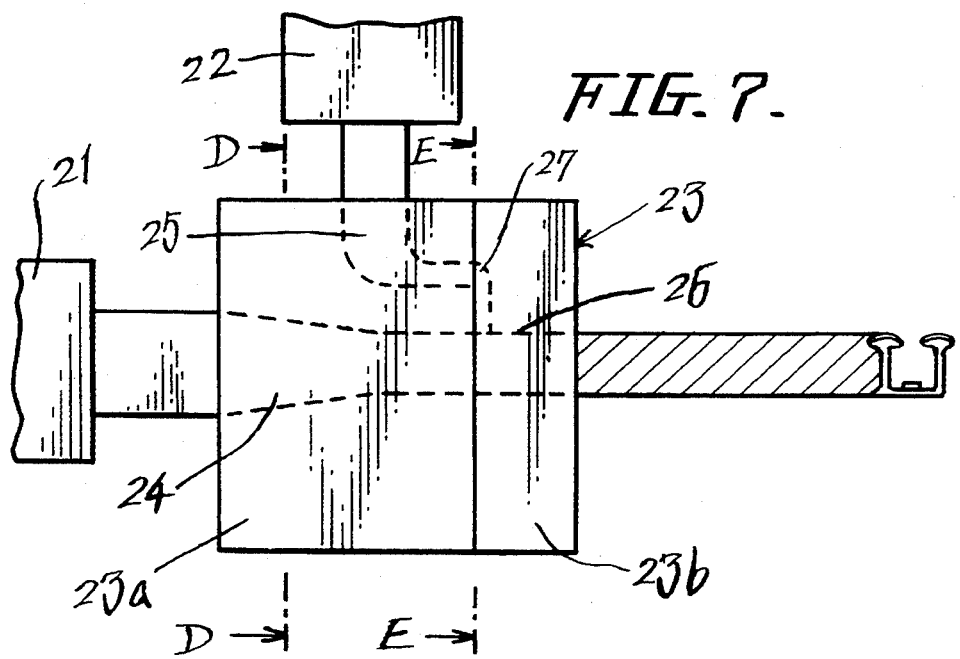
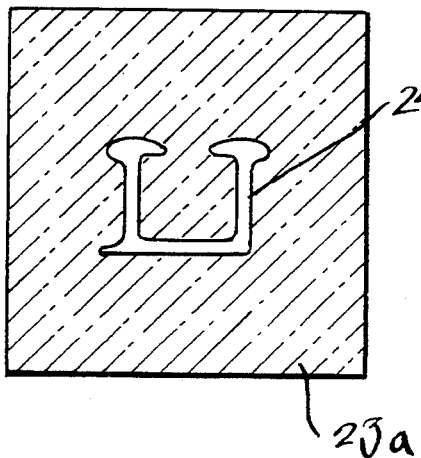
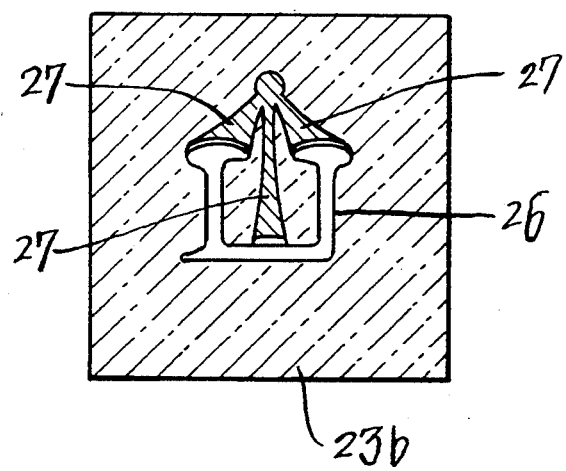

METHOD FOR MANUFACTURING WEATHER STRIPS FOR MOTOR VEHICLES

BACKGROUND OF THE INVENTION

The present invention relates to a method for manufacturing a weather strip which is attached to a vehicle body panel or a door panel with which a door glass pane in a motor vehicle is brought into contact, and more particularly to a method for manufacturing a weather strip, in which a protective film having a low friction characteristic and an increased tightness is integrally extruded with the weather strip body.

Conventionally, the known method for manufacturing this type of weather strip for motor vehicles comprises the step of forming an abutment portion, with which the glass pane may enter into contact, from a synthetic rubber or a thermal plastic elastomer having a flexibility, a resiliency and a low friction characteristic so as to retain a water-tightness, and so as to make smooth an opening and closing movement of the glass pane. However, in this weather strip manufacturing method, such synthetic rubber or thermal plastic elastomer for forming the abutment portion has a problem in that it may be susceptible to damage if it is subject to a slight rubbing action, and its skin may be easily toughened and torn off upon being contacted by a solvent such as a white gasoline.

Another manufacturing method of the weather strip is also known, wherein the method comprises the step of melting a urethane resin or a nylon onto the abutment portion of the weather strip in order to prevent the weakening of a synthetic rubber or a thermal plastic elastomer to form the abutment portion of the weather strip. However, there has been a drawback in this weather strip manufacturing method that an increased frictional resistance may serve to prevent smooth opening and closing movements of the glass pane, and that the manufacturing process is expensive and cumbersome, since the steps of heating and melting the urethane resin and nylon must be carried out separately from the step of molding the weather strip body.

Furthermore, another weather strip manufacturing method is also known, wherein the method comprises the step of adhesively bonding a synthetic resin tape having molybdenum material with the abutment portion of the weather strip so as to improve the sliding characteristics of the latter. However, in this weather strip manufacturing method, the step of adhesively bonding the tape over the abutment portion is not only very difficult and cumbersome to carry out, but it also causes a problem in that the synthetic tape may not be adhesively bonded with sufficient strength over non-flat portions such as curved and corner areas of the weather strip.

SUMMARY OF THE INVENTION

It is an object of the invention to provide a method for manufacturing a weather strip for motor vehicles, wherein a protective film is simultaneously extruded, and polymerized integrally with, the weather strip body at the time when the weather strip body is extruded. This results in the protective film having a toughness, a low friction characteristic and an increased tightness. The protective film can be formed on the abutment portion with which the door glass pane is brought into contact.

The method for manufacturing the weather strip for motor vehicles in accordance with the present invention, comprises the steps of inserting and melting, in one extrusion molding machine, an olefin polymer based resin or the foamed material thereof to form a weather strip body having an abutment portion with which a glass pane is brought into contact; inserting and melting, in another molding machine, a mixture including a base material comprising an olefin polymer based resin having low viscosity and high fluidity and an additive material comprising an olefin polymer based resin having a high viscosity and low fluidity in the form of grains or particles, to form a protective film over the abutment portion of the weather strip; and extruding and polymerizing the olefin polymer based resin or its foamed material for the weather strip body and the mixture including the base material and additive material for the protective film through the two molding machines and into a mold.

In co-extruding the weather strip body and the protective film, a strong and integral polymerization takes place between the olefin polymer based resin of the weather strip body or its foamed material and the low viscosity olefin polymer based resin of the protective film base material, since they have compatibility. Furthermore, since the grains or particles of the olefin polymer based resin of the additive material for the protective film have a high viscosity and reduced fluidity, they may form a rough surface with a plurality of protrusions.

BRIEF DESCRIPTION OF THE DRAWINGS

FIG. 2 is a vertically cross-sectional view taken along line B—B in FIG. 1;

FIG. 7 is an enlarged elevation view of molding machines and its mold;

FIG. 8 is a vertically cross sectional view of the mold taken along line D—D in FIG. 7; and FIG. 9 is a vertically cross sectional view taken along line E—E in FIG. 7.

DETAILED DESCRIPTION OF THE PREFERRED EMBODIMENT

One embodiment of the method for manufacturing a weather strip in accordance with the present invention will be described hereinbelow, with reference to the accompanying drawings.

Figure 1:
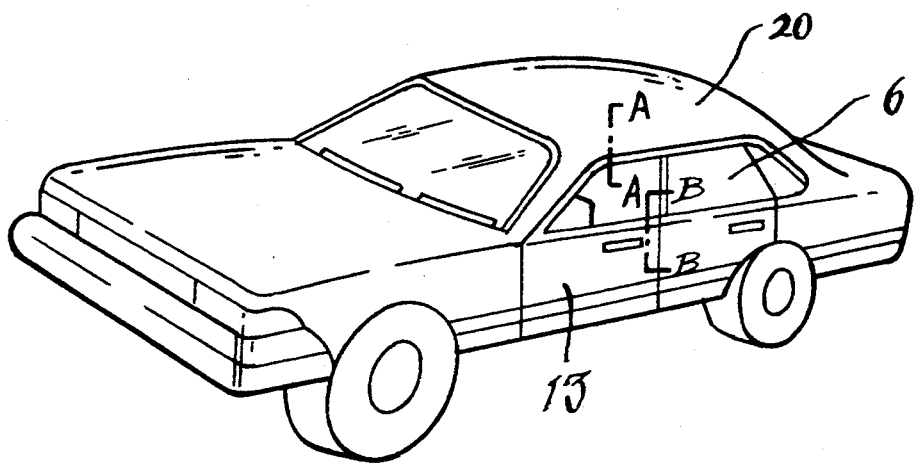
FIG. 1 is a perspective view showing that a weather strip produced by a method of the present invention in use in respective portions in a motor vehicle.
Figure 2:
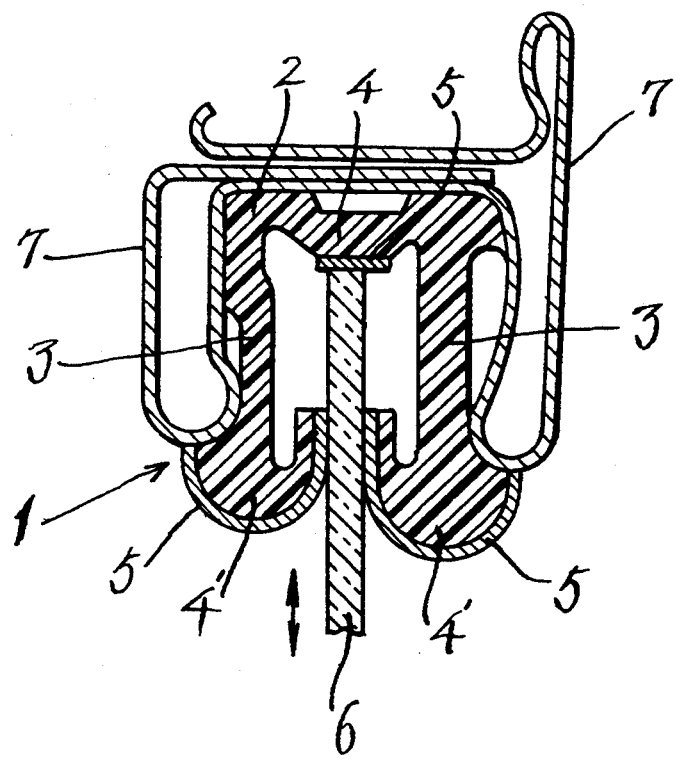
FIG. 2 is a vertically cross-sectional view taken along line A—A in FIG. 1.

A weather strip body 1 is formed by an olefin polymer based resin, or a foamed material and is attached to a vehicle body panel 7 and a door panel 18 with which a door glass panel 6 mounted to a vehicle body 20 of a motor vehicle may enter into contact. The weather strip body 1 in the embodiment as shown in FIG. 2 comprises an attachment portion 2 formed at its bottom and a vertical support strip 3 which depends from the opposite sides thereof. The attachment portion 2 is provided at its central porion with an abutment portion 4, with which the glass pane 6 is contacted. The vertical support strip 3 are provided at their tips (free ends) with abutment portion 4; respectively with which the glass pane 6 is contacted. These abutment potions, 4' of the weather strip body 1 are integrally formed with a protective film 5 at the time when the weather strip body 1 is extrusion-molded, whereby the protective film 5 may be polymerized. The protective film is formed by a mixture consisting of a base material of olefin polymer based resin having low viscosity and high fluidity and grains or particles of an additive material of olefin polymer based resin having high viscosity and low fluidity.

In the manufacturing steps as shown in FIG. 6 to FIG. 9., an olefin polymer based resin is poured into one molding machine 21 and is melted by heating, to form the weather strip 1 having the abutment portions 4 with which the glass pane may enter into contact.

The mixture of the base material comprising the olefin polymer based resin with low viscosity and high fluidity and the additive material comprising the olefin polymer based resin with high viscosity and low fluidity in the form of grains or particles is poured into the other molding machines 22 and is melted by heating, to form the protective film 5 over the abutment portions 4 of the weather strip body 1.

The molding machines 21 and 22 are connected with one mold 23, and the olefin polymer based resin which forms the weather strip body 1 and the mixture of the base material and additive material which forms the protective film 5 are extruded into the mold 23.

The mold 23 comprises two mold sections 23a and 23b, the mold section 23a is provided with a guide slot 24 in a shape that conforms to that of the weather strip body 1 and with a flow slot 25 for the protective film 5, the mold section 23b is provided with an extrusion port 26 having a configuration that conforms to that of the weather strip body 1 and the protective film 5. The guide slot 24 for the weather strip 1 is connected with the extrusion port 26, and the flow slot 25 for the protective film is in communication with the extrusion port 26 through a guide grooves 27 formed in the mold section 23b.

The olefin polymer based resin of the weather strip body 1 is extruded out of the molding machine 21 to the mold 23 through the guide slot 24, and the mixture of the protective film 5 is extruded out of the extrusion molding machine 22 to the mold 23 through the guide groove 27. The weather strip body 1 and the protective film 5 is polymerized and extruded through the extrusion port 26 of the mold 23. The protective film 5 is formed on the weather strip body 1 when the weather strip body 1 is extruded.

During the process of co-extruding the weather strip body 1 and the protective film 5, the olefin polymer based resin of the additive material for the protective film 5 may not be completely melted like the polyolefin-based resin of the base material while in a melting configuration, since it has a high viscosity and a low fluidity, and is extruded in a configuration with the grains or particles retained to a certain extent. Thus, a rough surface having a plurality of protrusions is formed at the surface of the protective film 5. Subsequently, the extruded product with the rough surface is cooled by passing it through a cooling tank 28, and cut to a proper length as needed to form the finished product A.

The base material for the protective film 5 uses a low viscosity polyethylene having a melt flow rate of over 0.6 g/10 minutes (ASTM D1238 190° C.), and the additive material in the form of the grains and particles uses a high viscosity polyethylene having a flow melt rate of less than 0.1 g/10 minutes (ASTM D1238 190° C.).

In the embodiment of the method for manufacturing the weather strip in accordance with the present invention, the mixture contains 70–90% base material and 10–30% additive material. The grains or particles of the additive material are selected to be of a grain or particle size in the range of 0.005 mm~0.15 mm. The olefin polymer based resin or the foamed material thereof which forms the weather strip body is poured into the extrusion molding machine 21 and is heated to a temperature of 190° C., whereas the mixture of the protective film which is poured into the co-extrusion molding machine 22 is heated to the temperature of 220° C. A satisfactorily rough surface may be formed at the surface of the protective film at the time when the protective film is polymerized with a thickness of 0.04 mm upon the weather strip body in the mold 23 which is heated up to 190° C.

Figure 3:
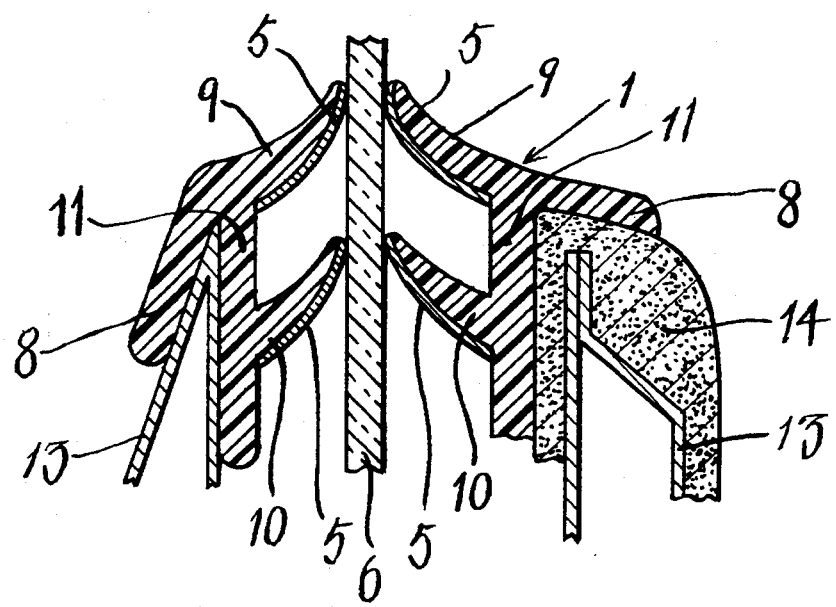

The weather strip body 1 of an embodiment shown in FIG. 3 is interposed between a draining frame of the door panel 13 and a leather portion 14. The weather strip body 1 comprises a vertical support strip 11 which stands upright in opposition against the glass pane 6, and a mounting portion 8 which protrudes outwardly from the support strip 11. The vertical support strip 11 is provided with an upper abutment portion 9 and a lower abutment portion 10, each of which is protrudes toward and into contact with the glass pane 6. The upper abutment portion 9 and the lower abutment portion 10 of the weather strip body 1 are integrally provided with the protective film 5. By using the component material, two extrusion molding machines 21 and 22, and a mold 23, as described above in connection with the manufacturing process, the protective film 5 is extruded at the same time that the weather strip body 1 is extruded, and is polymerized unitedly with the weather strip body 1.

Figure 4:
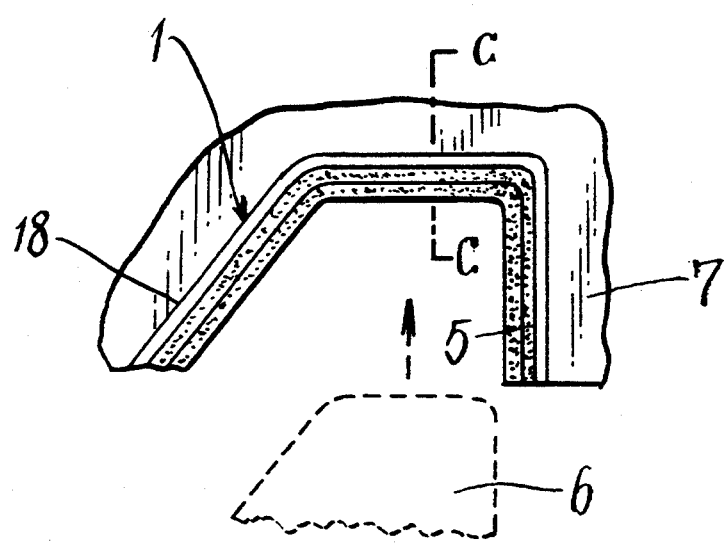
FIG. 4 is a partially cut-away front view showing the weather strip, produced in accordance with the present invention, mounted on a motor vehicle body panel.
Figure 5:
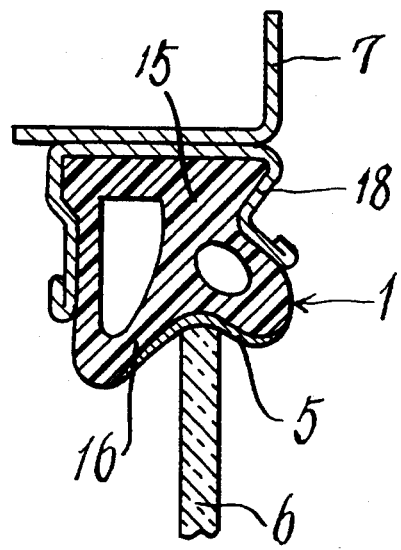
FIG. 5 is a vertically cross-sectional view taken along line C—C in FIG. 4.
Figure 6:
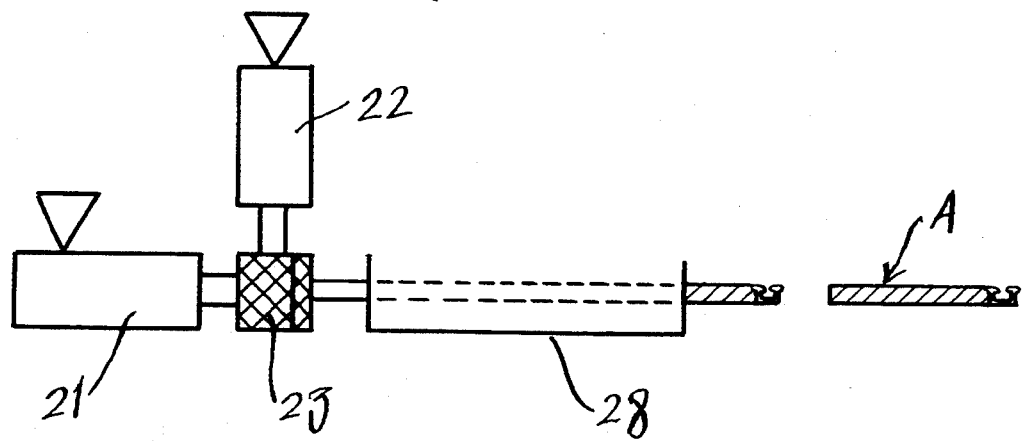
FIG. 6 is a schematic view showing a process for manufacturing the weather strip for motor vehicles in accordance with the present invention.

The weather strip body 1 in the embodiment shown in FIG. 4 and FIG. 5 is secured in position upon a support sash 18 which is provided on the body panel 7 against which the upper edge of the door glass pane 6 may abut. The weather strip body 1 is provided with a mounting portion 15 for attachment to the support sash 18 at the upper portion, and at the lower portion with an abutment portion 16 against which the glass pane 6 may enter into abutment. By extrusion molding machines 21 and 22, and a mold 23, as described above in connection with the manufacturing process, the abutment portion 16 of the weather strip body 1 is provided with the protective film 5 which is co-extruded at the same time that the weather strip body 1 is extruded and is polymerized unitedly with the weather strip body 1.

Since the protective film in the manufacturing method of the weather strip for motor vehicles in accordance with the present invention is unitedly and fixedly polymerized on the abutment portion with which the glass pane is brought into contact, the protective film can be used for longer periods without being abnormally abraded or peeled-off from the weather strip body. Moreover, since the protective film is integrally polymerized on the abutment portion simultaneously with the extrusion molding of the weather strip body, the manufacturing process is relatively simple. Furthermore, since a rough surface with a plurality of protrusions may be formed on the surface of the protective film, the opening and closing operation of the glass pane can be conducted smoothly due to such rough surface and a water tightness for the glass pane can be completely retained.

What is claimed is:

1. A method for manufacturing a weather strip for use in a motor vehicle, said method comprising:

inserting into a first extrusion molding machine a weather strip body material comprising an olefin polymer based resin;

heating said weather strip body material in said first extrusion molding machine to melt said weather strip body material;

inserting into a second extrusion molding machine a protective film material comprising a mixture of a base material and an additive material, said base material comprising an olefin polymer based resin having low viscosity and high fluidity, and said additive material comprising grains or particles of an olefin polymer based resin having a viscosity higher than that of said base material and a fluidity lower than that of said base material;

heating said protective film material in said second extrusion molding machine to melt at least said base material of said protective film material, such that said grains or particles of said additive material remain at least partially unmelted; and simultaneously extruding said weather strip body material and said protective film material from said first and second extrusion molding machines, respectively, and into and through an extrusion mold to unitarily form a weather strip body having at least one vehicle glass pane abutment portion and a protective film over said vehicle glass pane abutment portion, whereby said protective film is provided with a rough surface having a plurality of protrusions formed by said grains or particles of said additive material.

2. A method as recited in claim 1, wherein
said weather strip body material inserted into said first extrusion molding machine comprises a foamed olefin polymer based resin.

3. A method as recited in claim 1, wherein
said base material of said protective film material comprises a low viscosity polyethylene having a melt flow rate above 0.5 g/10 minutes at 190° C., and said additive material of said protective film comprises a high viscosity polyethylene having a melt flow rate below 0.1 g/10 minutes at 190° C.

4. A method as recited in claim 1, wherein
said base material constitutes 70-90% of said protective film material, and said additive material constitutes 10-30% of said protective film material.

5. A method as recited in claim 4, wherein
said additive material has a grain or particle size of 0.005 mm to 0.15 mm.

6. A method as recited in claim 1, wherein
said additive material has a grain or particle size of 0.005 mm to 0.15 mm.

7. A method as recited in claim 1, wherein
in said step of heating said weather strip body material, said weather strip body material is heated to 190° C.;

in said step of heating said protective film material, said protective film material is heated to 220° C.; and in simultaneously extruding said weather strip body material and said protective film material through said extrusion mold, said extrusion mold is heated to 190° C., such that said weather strip body material and said protective film material are polymerized together to unitarily form said weather strip body with said protective film.

8. A method as recited in claim 7, wherein
said step of simultaneously extruding causes the protective film to have a thickness of 0.04 mm.

9. A method as recited in claim 5, wherein
in said step of heating said weather strip body material, said weather strip body material is heated to a first predetermined temperature;

in said step of heating said protective film material, said protective film material is heated to a second predetermined temperature; and in simultaneously extruding said weather strip body material and said protective film material through said extrusion mold, said extrusion mold is heated to said first predetermined temperature, such that said weather strip body material and said protective film material are polymerized together to unitarily form said weather strip body with said protective film.

* * * * *